United States Patent
Hatakeyama et al.

(10) Patent No.: US 10,248,375 B2
(45) Date of Patent: Apr. 2, 2019

(54) SOUND COLLECTING DEVICE CAPABLE OF OBTAINING AND SYNTHESIZING AUDIO DATA

(71) Applicant: Panasonic Intellectual Property Management Co., Ltd., Osaka (JP)

(72) Inventors: Takeshi Hatakeyama, Osaka (JP); Kou Watanabe, Osaka (JP); Masahiko Yamamoto, Osaka (JP); Masaaki Higashida, Osaka (JP); Tsutomu Uenoyama, Osaka (JP); Satoshi Ohyama, Hyogo (JP); Takahiro Yamaguchi, Osaka (JP); Masaharu Matsumoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/900,078

(22) Filed: Feb. 20, 2018

(65) Prior Publication Data

US 2019/0012132 A1    Jan. 10, 2019

Related U.S. Application Data

(60) Provisional application No. 62/529,481, filed on Jul. 7, 2017.

(51) Int. Cl.
*G06F 3/16* (2006.01)
*H04R 1/40* (2006.01)
(Continued)

(52) U.S. Cl.
CPC .............. *G06F 3/16* (2013.01); *H04R 1/406* (2013.01); *H04R 3/005* (2013.01); *H04R 29/001* (2013.01); *H04R 29/005* (2013.01); *H04R 29/006* (2013.01)

(58) Field of Classification Search
None
See application file for complete search history.

(56) References Cited

U.S. PATENT DOCUMENTS

2009/0052688 A1 * 2/2009 Ishibashi ............... H04R 1/403
                                                                381/92
2009/0232318 A1 * 9/2009 Ohta ..................... H04R 29/001
                                                                381/56
(Continued)

FOREIGN PATENT DOCUMENTS

| JP | 2007013400 A | * | 1/2007 |
| JP | 2008-193196 | | 8/2008 |
| JP | 2015-22423 | | 2/2015 |

OTHER PUBLICATIONS

Computer translation of JP 2007-013400, Jan. 18, 2007.*

*Primary Examiner* — Tan X Dinh
(74) *Attorney, Agent, or Firm* — Wenderoth, Lind & Ponack, L.L.P.

(57) ABSTRACT

A sound collecting system includes a plurality of sound collecting units that collect sound and a sound collecting device. The plurality of sound collecting units send sound collection data including audio data and time data to the sound collecting device. The sound collecting device includes a processor that manages time for the plurality of sound collecting units and receives an instruction specifying a sound collecting location, and an output unit. The processor of the sound collecting device synthesizes the audio data of the plurality of sound collecting units on the basis of the time data of the plurality of sound collecting units, and outputs, from the output unit, the audio data of the sound collecting location.

16 Claims, 8 Drawing Sheets

(51) Int. Cl.
*H04R 3/00* (2006.01)
*H04R 29/00* (2006.01)

(56) References Cited

U.S. PATENT DOCUMENTS

| | | | | |
|---|---|---|---|---|
| 2009/0248408 | A1* | 10/2009 | Ishibashi | H04M 3/56 704/226 |
| 2011/0069847 | A1* | 3/2011 | Takahashi | H04R 3/005 381/92 |
| 2012/0163610 | A1* | 6/2012 | Sakagami | H04R 3/005 381/56 |
| 2014/0219472 | A1* | 8/2014 | Huang | H04R 1/406 381/92 |
| 2015/0281832 | A1* | 10/2015 | Kishimoto | G06F 3/0304 381/92 |
| 2015/0312662 | A1* | 10/2015 | Kishimoto | H04R 3/005 381/92 |

* cited by examiner

SOUND COLLECTING DEVICE CAPABLE OF OBTAINING AND SYNTHESIZING AUDIO DATA

CROSS-REFERENCE TO RELATED APPLICATIONS

This patent application claims the benefit of U.S. Provisional Patent Application 62/529,481, filed Jul. 7, 2017, the disclosure of which is incorporated herein by reference.

BACKGROUND

Technical Field

This disclosure relates to sound collecting devices, sound collecting systems, and sound collecting methods.

Description of the Related Art

JP 2017-175598A discloses a configuration in which an audio signal through which sound is outputted is selected on the basis of sound collecting unit arrangement information indicating two or more sound collecting units and information regarding the arrangement of the sound collecting units. According to this configuration, audio from a specified sound collecting location can be more accurately reproduced.

SUMMARY

This disclosure provides a sound collecting device, a sound collecting system, and a sound collecting method useful in collecting sound at a specified position.

A sound collecting device according to an aspect of this disclosure is a sound collecting device that obtains and synthesizes audio data from a plurality of sound collecting units that collect sound. The device includes a processor that manages time for the plurality of sound collecting units and receives an instruction specifying a sound collecting location, and an output unit that outputs the synthesized audio data. The processor obtains sound collection data including the audio data and time data from the plurality of sound collecting units; and synthesizes the audio data from the plurality of sound collecting units on the basis of the time data and outputs, from the output unit, the audio data of the sound collecting location.

A sound collecting system according to an aspect of this disclosure includes the above-described sound collecting device and a plurality of sound collecting units connected to the sound collecting device.

A sound collecting method according to an aspect of this disclosure is a sound collecting method using a sound collecting device that obtains and synthesizes audio data from a plurality of sound collecting units that collect sound. The method includes sending sound collection data including the audio data from the plurality of sound collecting units and time data to the sound collecting device; and upon an instruction specifying a sound collecting location being received, synthesizing the audio data of the plurality of sound collecting units on the basis of the time data of the plurality of sound collecting units, and outputting the audio data of the sound collecting location, using the processor of the sound collecting device.

The sound collecting device, sound collecting system, and sound collecting method according to this disclosure are useful in collecting sound at a specified position.

DESCRIPTION OF EMBODIMENTS

Embodiments will be described in detail hereinafter with reference to the drawings where appropriate. There are, however, cases where descriptions are omitted when further detail is not necessary. For example, detailed descriptions of well-known items, redundant descriptions of substantially identical configurations, and so on may be omitted. This is to avoid unnecessary redundancy in the descriptions and facilitate understanding for those of ordinary skill in the art.

Furthermore, the appended drawings and following descriptions are provided so that those of ordinary skill in the art can fully understand this disclosure, and are not intended to limit the matter stated in the claims.

Figure 1:
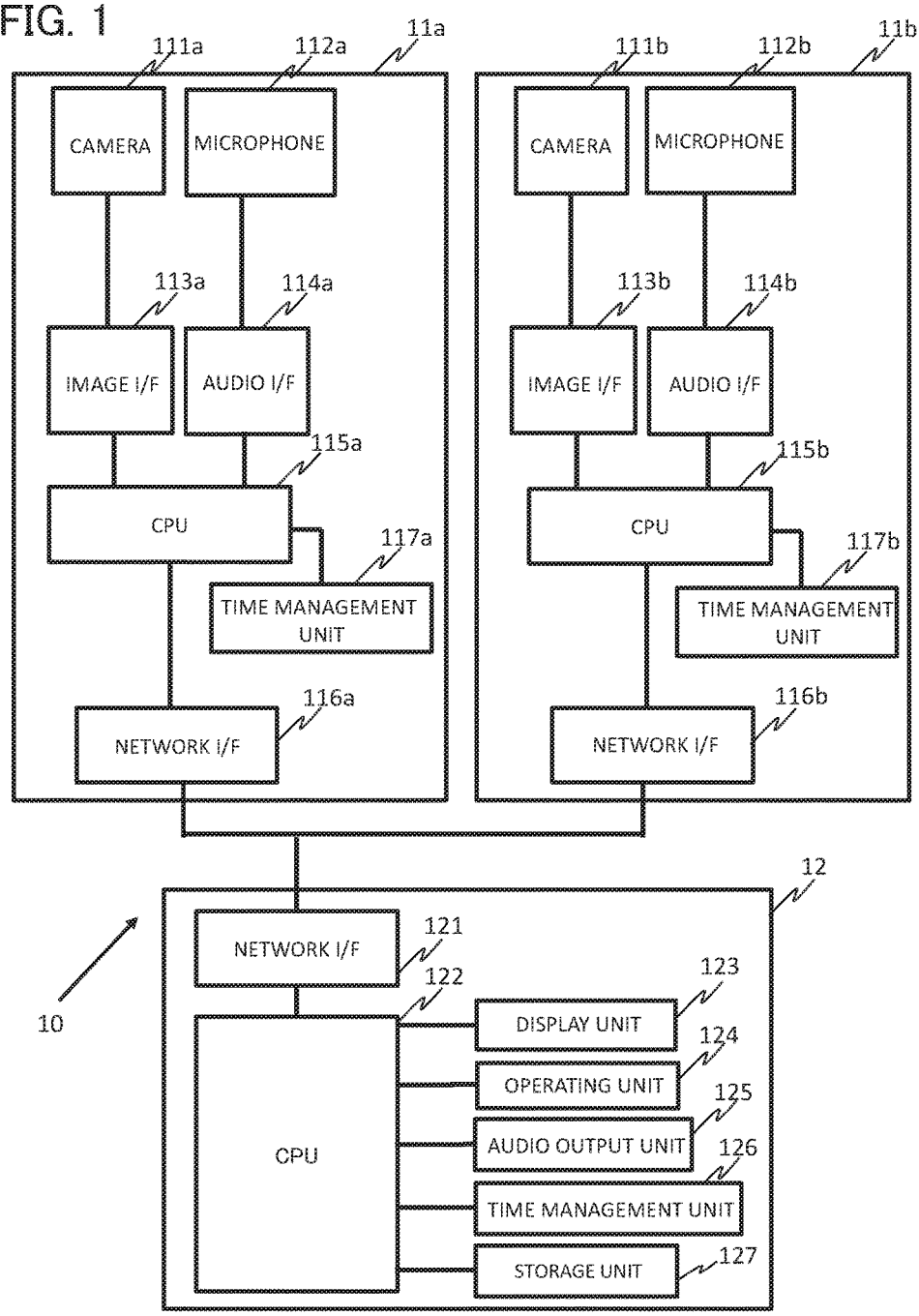
FIG. 1 schematically illustrates the configuration of a sound collecting system according to a first embodiment.

First Embodiment 1-1. Configuration and Overall Operations of Sound Collecting System FIG. 1 is a schematic diagram illustrating a sound collecting system 10 according to the first embodiment. The configuration and overall operations of the sound collecting system 10 according to this embodiment will be described hereinafter on the basis of FIG. 1.

The sound collecting system 10 includes a sound collecting unit 11a, a sound collecting unit 11b, and a sound collecting device 12. The sound collecting unit 11a and the sound collecting unit 11b send captured image data and collected audio data to the sound collecting device 12 over a network.

The sound collecting unit Ila includes a camera 111a, an image I/F 113a, a CPU 115a, and a network I/F 116a. The image data captured by the camera 111a is imported by the CPU 115a via the image I/F 113a. The CPU 115a is a processor or a circuit that executes processes in accordance with a computer program stored in a memory (not illustrated). The image data imported by the CPU 115a is sent to the sound collecting device 12 via the network I/F 116a. The network is typically an Ethernet network, but may be a wireless network as well.

The sound collecting unit 11a further includes a microphone 112a, an audio I/F 114a, and a time management unit 117a. Sound collection data collected by the microphone 112a is imported by the CPU 115a and sent to the sound collecting device 12 via the audio I/F 114a. The sound collection data includes audio data and time data.

The time management unit 117a manages time for the sound collecting unit 11a. The time management unit 117a manages time on the basis of a time management unit 126 of the sound collecting device, which will be mentioned later. The time management of the time management unit 117a is executed by the CPU 115a.

Like the sound collecting unit 11a, the sound collecting unit 11b includes a camera 111b, a microphone 112b, an image I/F 113b, an audio I/F 114b, a CPU 115b, a network I/F 116b, and a time management unit 117b. The configuration and functions of the sound collecting unit 11b are the same as those of the sound collecting unit 11a, and thus descriptions thereof will be omitted.

Next, the configuration and operations of the sound collecting device 12 will be described in detail. The sound collecting device 12 includes a network I/F 121, a CPU 122 (an example of a processor), a display unit 123, an operating unit 124, an audio output unit 125, the time management unit 126, and a storage unit 127 (an example of a memory).

The sound collecting device 12 is connected to the sound collecting unit 11a and the sound collecting unit 11b by the network I/F 121, which is a receiving unit. The CPU 122 is a processor or a circuit that executes processes in accordance with a computer program stored in the storage unit 127. The CPU 122 displays images captured by the cameras 111a and 111b in the display unit 123 on the basis of the image data received from the sound collecting unit 11a and the sound collecting unit 11b. The display unit 123 is a liquid crystal display, for example. The operating unit 124 accepts an input specifying a sound collecting location. The operating unit 124 is, for example, a touch panel provided in a screen of the display unit 123. A user specifies the sound collecting location by touching a desired position in an image displayed in the screen of the display unit 123. Note that the operating unit 124 may be an input device such as a keyboard or a mouse. Furthermore, the operating unit 124 need not be provided, and the sound collecting location may be specified over a network, for example.

Upon a desired position being specified by the operating unit 124 being operated, the CPU 122 accepts an instruction specifying the sound collecting location, and synthesizes the audio data of the specified sound collecting location on the basis of the audio data and the time data received from the sound collecting units 11a and 11b. When synthesizing the audio data, the CPU 122 synthesizes the audio data so as to reflect audio latency, network latency, and so on of the sound collecting units 11a and 11b.

The time management unit 126 manages time serving as a reference for the time managed by the time management unit 117a of the sound collecting unit 11a and the time managed by the time management unit 117b of the sound collecting unit 11b. Time data of the time managed by the time management unit 126 is periodically sent from the sound collecting device 12 to the sound collecting unit 11a and the sound collecting unit 11b. The time management carried out by the time management unit 117b is executed by the CPU 115b.

The sound collecting unit 11a corrects the time data of the time management unit 117a on the basis of the time data of the time management unit 126 of the sound collecting device 12. Likewise, the sound collecting unit 11b corrects the time data of the time management unit 117b on the basis of the time data of the sound collecting device 12.

When the sound collecting units 11a and 11b correct their respective instances of time data on the basis of the time data of the time management unit 126, the sound collecting units 11a and 11b monitor information of the congestion of the network, correct the time data of the time management units 117a and 117b, respectively, by predicting the latency time of the network, and then update the times managed by the time management units 117a and 117b, respectively.

Synchronizing the times managed by the time management unit 117a of the sound collecting unit 11a and the time management unit 117b of the sound collecting unit 11b with the time managed by the time management unit 126 of the sound collecting device 12 in this manner makes it possible to more accurately collect audio at the specified location.

1-2. Positional Relationships of Cameras and Microphones

Figure 2:
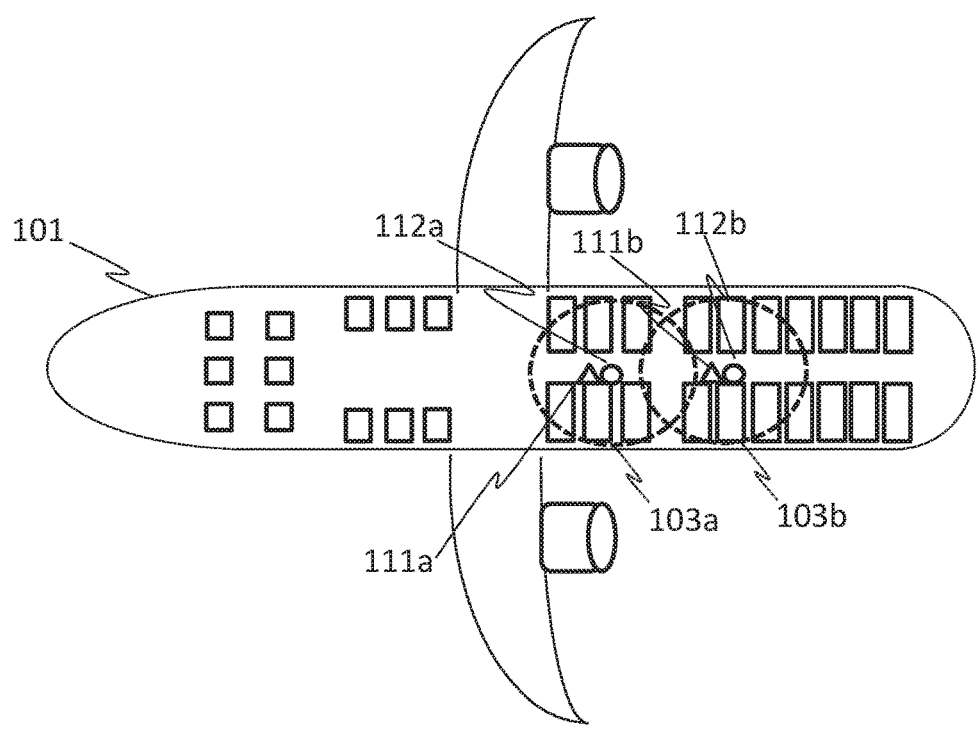
FIG. 2 illustrates an example of the arrangement of cameras and microphones in an aircraft.

FIG. 2 illustrates an example of the arrangement of the camera 111a, the camera 111b, the microphone 112a, and the microphone 112b according to the first embodiment. The first embodiment describes an example in which the sound collecting system 10 is installed in an aircraft 101. The camera 111a, the camera 111b, the microphone 112a, and the microphone 112b are installed in, for example the ceiling above an aisle in the aircraft 101.

In the first embodiment, a visible range of the camera 111a and an audible range of the microphone 112a constitute a predetermined first range 103a in the aircraft 101, and a visible range of the camera 111b and an audible range of the microphone 112b constitute a predetermined second range 103b in the aircraft 101. The first range 103a and the second range 103b at least partially overlap. In this embodiment, when, for example, a sound collecting location present in the area where the first range 103a and the second range 103b overlap is specified, the audio data collected by the microphones 112a and 112b is synthesized, and the audio of the specified sound collecting location is played back. However, it is also conceivable to synthesize the audio data collected by the microphones 112a and 112b even if the sound collecting location has been specified in an area where the first range 103a and the second range 103b do not overlap.

1-3. Audio Synthesis by Sound Collecting Device

An audio synthesis process carried out by the sound collecting device 12 will be described next. It is assumed here that the audio synthesis process is carried out by the CPU 122 of the sound collecting device 12.

Figure 3:
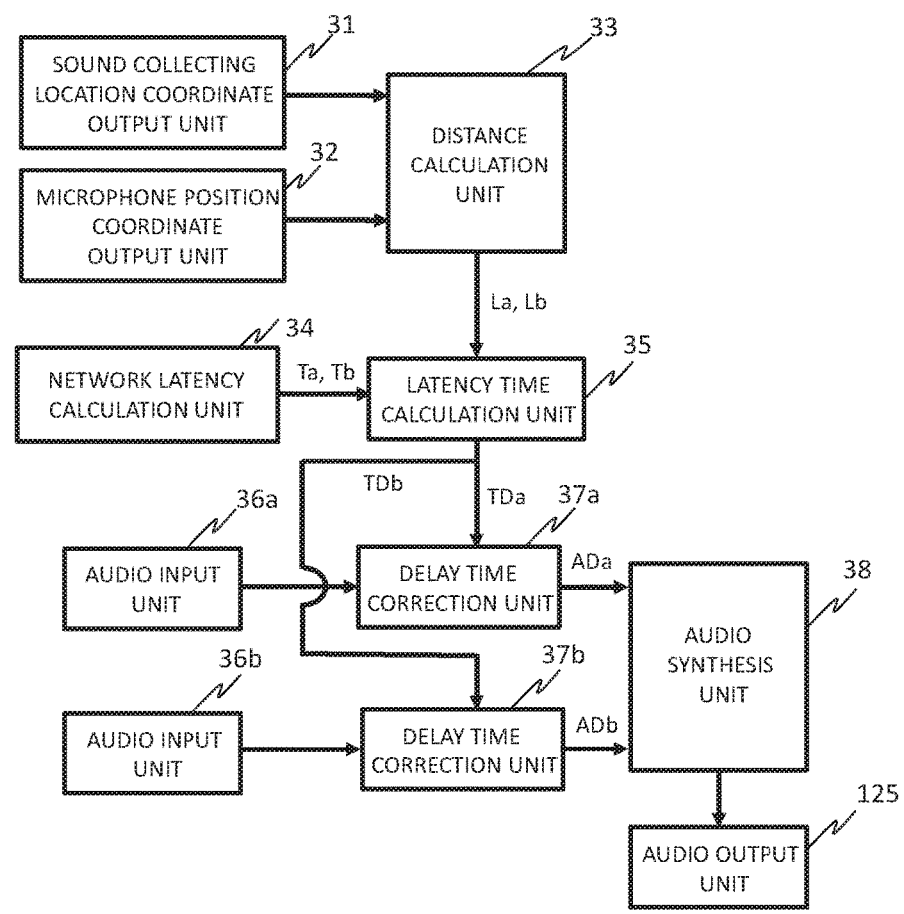
FIG. 3 is a block chart illustrating an audio synthesis process of a sound collecting device.

FIG. 3 is a block chart illustrating the audio synthesis process executed by the CPU 122 of the sound collecting device 12. The CPU 122 implements the functions of a sound collecting location coordinate output unit 31, a microphone location coordinate output unit 32, a distance calculation unit 33, a network latency calculation unit 34, a latency time calculation unit 35, an audio input unit 36a, an audio input unit 36b, a latency time correction unit 37a, a latency time correction unit 37b, and an audio synthesis unit 38.

When the operating unit 124 is operated and a desired sound collecting location is specified, the sound collecting location coordinate output unit 31 outputs location coordinate data of the specified sound collecting location to the distance calculation unit 33.

When the operating unit 124 is operated and a desired sound collecting location is specified, the microphone location coordinate output unit 32 outputs location coordinate data of the microphones 112a and 112b to the distance calculation unit 33. The location coordinates of the specified sound collecting location may be identified using a known method. The location coordinate data of the microphones 112a and 112b is stored in the storage unit 127 of the sound collecting device 12.

The distance calculation unit 33 calculates a microphone 112a-to-specified sound collecting location distance from the location coordinate data of the specified sound collecting location and the location coordinate data of the microphone 112a. The distance calculation unit 33 calculates a microphone 112b-to-specified sound collecting location distance from the location coordinate data of the specified sound collecting location and the location coordinate data of the microphone 112b.

The network latency calculation unit 34 calculates the latency times of the sound collecting units 11a and 11b arising from the network on the basis of the time data received from the sound collecting units 11a and 11b.

The latency time calculation unit 35 calculates latency times of the microphones 112a and 112b with respect to the specified sound collecting location on the basis of the distances calculated by the distance calculation unit 33 and the network latency times of the sound collecting units 11a and 11b calculated by the network latency calculation unit 34.

For example, assume the following:
microphone 112a-to-specified sound collecting location distance: La
microphone 112b-to-specified sound collecting location distance: Lb
acoustic velocity: V
network latency time from sound collecting unit 11a: Ta
network latency time from sound collecting unit 11b: Tb
In this case, the latency times of the microphones 112a and 112b with respect to the specified sound collecting location are calculated as follows.
latency time of microphone 112a: TDa=La/V−Ta
latency time of microphone 112b: TDb=Lb/V−Tb The audio input unit 36a imports the audio data sent from the sound collecting unit 11a and outputs the imported audio data to the latency time correction unit 37a.

The audio input unit 36b imports the audio data sent from the sound collecting unit 11b and outputs the imported audio data to the latency time correction unit 37b.

The latency time correction unit 37a corrects the latency time TDa for the audio data of the sound collecting unit 11a outputted by the audio input unit 36a.

The latency time correction unit 37b corrects the latency time TDb for the audio data of the sound collecting unit 11b outputted by the audio input unit 36b.

For example, if TDa>TDb, latency processing of (TDa−TDb) is carried out on the audio data from the audio input unit 36a, and latency processing of 0 is carried out on the audio data from the audio input unit 36b.

The audio synthesis unit 38 synthesizes audio data ADa of the microphone 112a resulting from the correction by the latency time correction unit 37a and audio data ADb of the microphone 112b resulting from the correction by the latency time correction unit 37b, and outputs the synthesized audio data to the audio output unit 125.

1-4. Effects, Etc.

With the sound collecting device according to the first embodiment as described thus far, synchronizing the times managed by the sound collecting units with the time managed by the sound collecting device makes it possible to more accurately collect audio at the specified location.

Second Embodiment 2-1. Configuration and Overall Operations of Sound Collecting System In the second embodiment, the audio synthesis process carried out by the CPU 122 is partially different from that in the first embodiment. In the following, descriptions of configurations that are the same as in the first embodiment will be omitted, and configurations different from those of the first embodiment will be described in detail.

2-2. Positional Relationships of Cameras and Microphones

Figure 4:
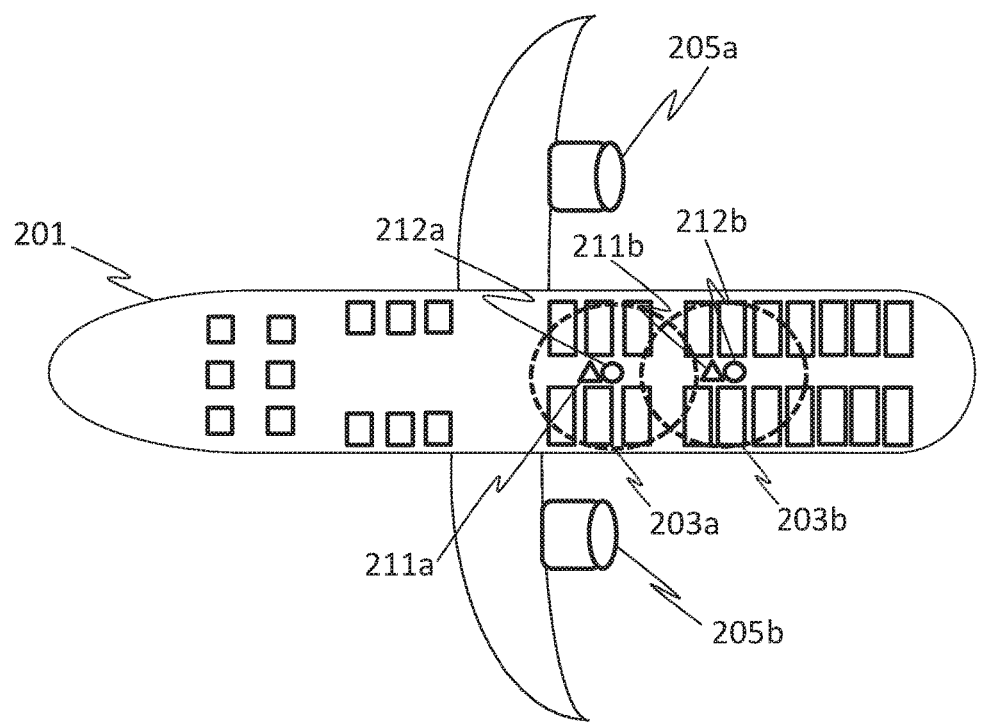
FIG. 4 illustrates an example of the arrangement of cameras and microphones in an aircraft according to a second embodiment.

In the second embodiment, noise sources 205a and 205b are present, as illustrated in FIG. 4. The noise sources 205a and 205b in the second embodiment are engines attached to the left and right wings of an aircraft 201, for example. Location coordinate data of the noise sources 205a and 205b is stored in the storage unit 127. Note that the locations of a camera 211a, a camera 211b, a microphone 212a, a microphone 212b, a first range 203a, and a second range 203b are the same as the corresponding ones in the first embodiment.

2-3. Audio Synthesis by Sound Collecting Device

An audio synthesis process carried out by the sound collecting device 12 according to the second embodiment will be described next. It is assumed here that the audio synthesis process is carried out by the CPU 122 of the sound collecting device 12, in the same manner as in the first embodiment.

Figure 5:
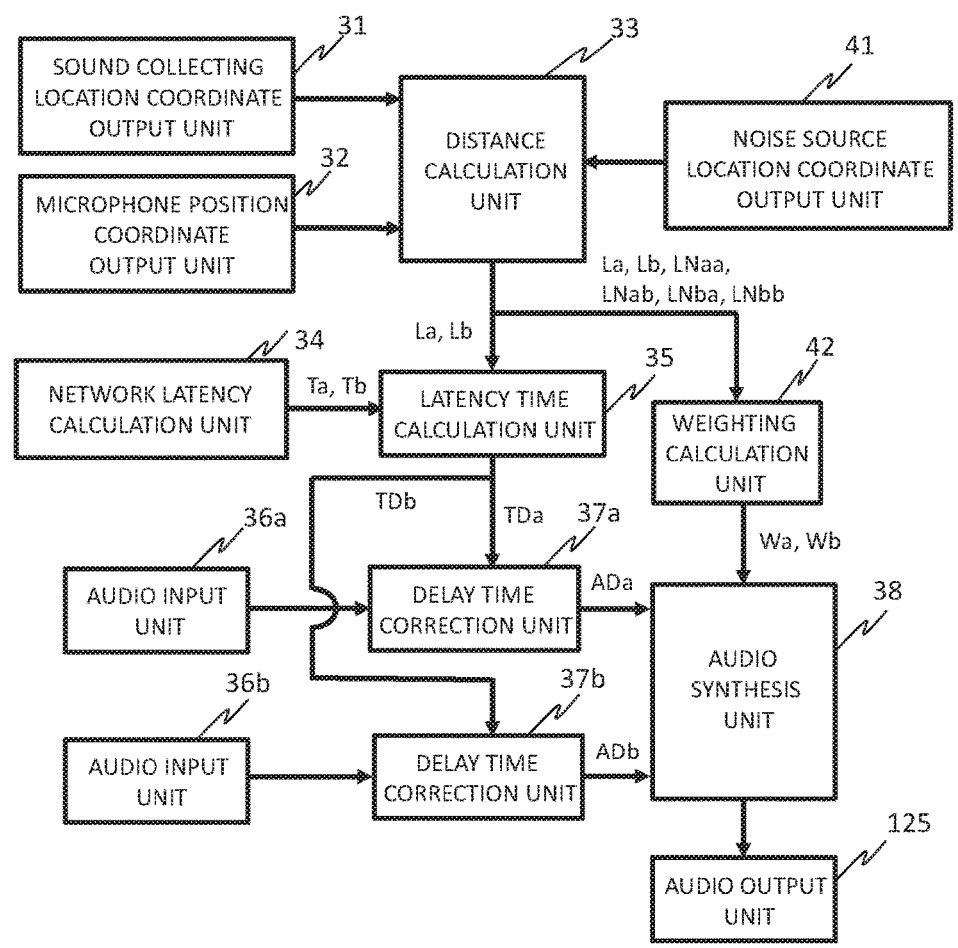
FIG. 5 is a block chart illustrating an audio synthesis process of a sound collecting device according to the second embodiment.

FIG. 5 is a block chart illustrating the audio synthesis process of the sound collecting device 12 according to the second embodiment. In the second embodiment, the functions of a noise source location coordinate output unit 41 and a weighting calculation unit 42 are further implemented by the CPU 122.

When the operating unit 124 is operated and a desired sound collecting location is specified, the noise source location coordinate output unit 41 outputs location coordinate data of the noise sources 205a and 205b to the distance calculation unit 33.

In addition to the processing described in the first embodiment, the distance calculation unit 33 calculates distances from the noise sources 205a and 205b to the microphones 212a and 212b on the basis of the location coordinate data of the noise sources 205a and 205b and the location coordinate data of the microphones 212a and 212b.

The weighting calculation unit 42 calculates weighting coefficients Wa and Wb for the audio data from the microphones 212a and 212b, respectively, on the basis of the distances calculated by the distance calculation unit 33. When calculating the weighting coefficients Wa and Wb, the weighting calculation unit 42 causes information of the distances between the noise sources 205a and 205b and the microphones 212a and 212b to be reflected therein. In other words, control is carried out such that the audio data from the microphone located farther from the noise sources 205a and 205b is used preferentially when synthesizing the audio data. Carrying out control such that the audio data of a microphone is used preferentially includes, for example, setting the frequency range, sound pressure level, and so on of one microphone to be greater than the other.

microphone 212a-to-noise source 205a distance: LNaa
microphone 212a-to-noise source 205b distance: LNab
microphone 212b-to-noise source 205a distance: LNba
microphone 212b-to-noise source 205b distance: LNbb The weighting calculation unit 42 calculates the weighting coefficients Wa and Wb for the audio data from the microphones 212a and 212b, respectively, on the basis of the distances between the microphones 212a and 212b and the specified sound collecting location (La and Lb) and the distances between the microphones 212a and 212b and the noise sources 205a and 205b. The weighting coefficients Wa and Wb are calculated on the basis of functions F(X,Y,Z) determined in advance on the basis of the distances La, Lb, LNaa, LNab, LNba, and LNbb.

In other words, the calculations are carried out as follows:
weighting coefficient Wa for audio data from microphone 212a=F(La,LNaa,LNab)

weighting coefficient Wb for audio data from microphone $212b$=F(Lb,LNba,LNbb)

Functions that decreases monotonically for X and increase monotonically for Y and Z are selected as F(X,Y,Z). F(X,Y,Z) =Y×Z/X can be given as one example. A monotonic decrease for X corresponds to synthesis that prioritizes the data from microphones closer to the specified sound collecting location, and a monotonic increases for Y and Z correspond to synthesis that prioritizes the data from microphones farther from the noise sources.

Using the weighting coefficients Wa and Wb, the audio synthesis unit 38 carries out processing such as that described below on the audio data ADa and ADb from the latency time correction units 37a and 37b, respectively, and outputs the synthesized audio data to the audio output unit 125.

$$Wa \times ADa + Wb \times ADb$$

2-4. Effects, Etc.

With the sound collecting device according to this embodiment as described thus far, when synthesizing audio from a sound collecting location selected by an operator on the basis of audio data from a plurality of microphones, the audio data from a microphone closer to the sound collecting location and farther from a noise source can be used preferentially.

Note that the distances La and Lb need not be used to calculate the weighting coefficients. The prescribed effect of preferentially using audio data further from a noise source can be achieved in this case as well.

Third Embodiment 3-1. Configuration and Overall Operations of Sound Collecting Device In the third embodiment, the audio synthesis process carried out by the CPU 122 is partially different from that in the second embodiment. In the following, descriptions of configurations that are the same as in the second embodiment will be omitted, and configurations different from those of the second embodiment will be described in detail.

3-2. Positional Relationships of Cameras and Microphones

Figure 6:
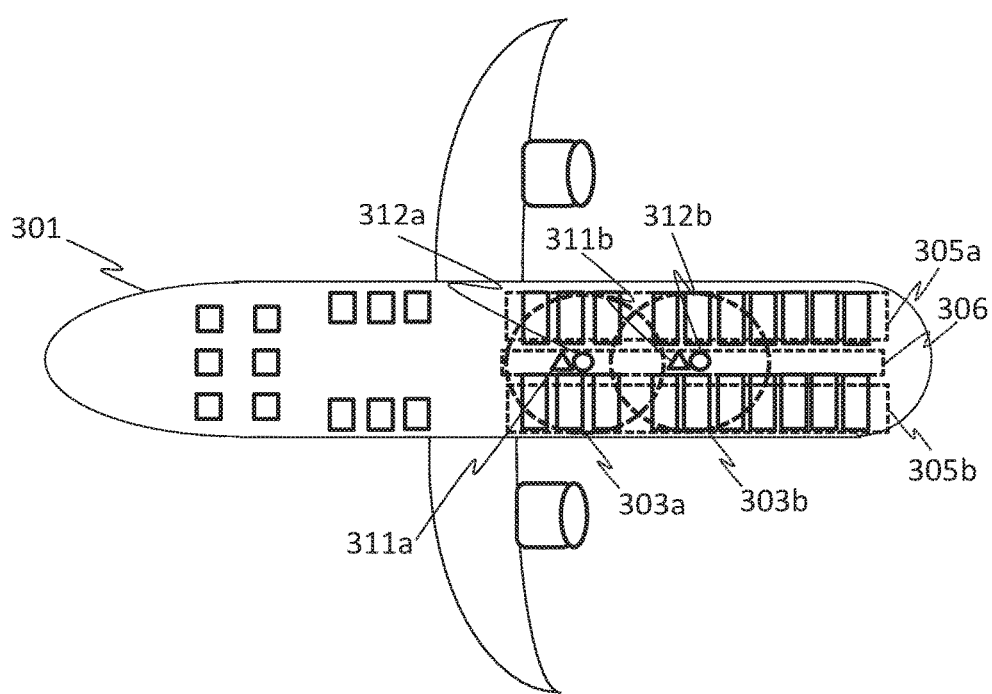
FIG. 6 illustrates an example of the arrangement of cameras and microphones in an aircraft according to a third embodiment.

In the third embodiment, it is assumed that seating areas 305a and 305b, in which audio is outputted primarily in a forward direction, and an aisle area 306, in which audio has no particular directional characteristics, are present in an aircraft 301, as illustrated in FIG. 6. Location coordinate data of the seating areas 305a and 305b and the aisle area 306 is stored in the storage unit 127. Note that the locations of a camera 311a, a camera 311b, a microphone 312a, a microphone 312b, a first range 303a, and a second range 303b are the same as the corresponding ones in the first and second embodiments.

3-3. Audio Synthesis by Sound Collecting Device

An audio synthesis process carried out by the sound collecting device 12 according to the third embodiment will be described next. It is assumed that the audio synthesis process is carried out by the CPU 122 of the sound collecting device 12.

Figure 7:
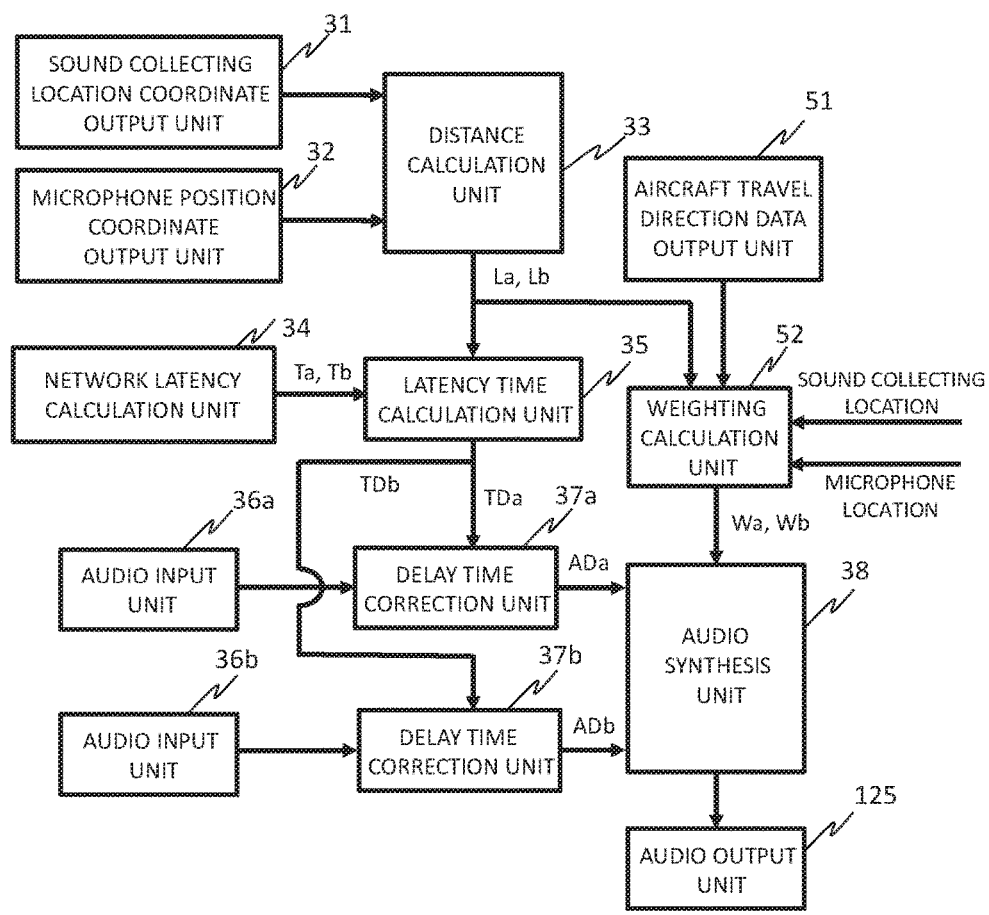
FIG. 7 is a block chart illustrating an audio synthesis process of a sound collecting device according to the third embodiment.

FIG. 7 is a block chart illustrating the audio synthesis process of the sound collecting device 12 according to the third embodiment. In the third embodiment, the function of an aircraft travel direction data output unit 51 is further implemented by the CPU 122.

The aircraft travel direction data output unit 51 outputs travel direction data of the aircraft 301 to a weighting calculation unit 52. The travel direction data of the aircraft 301 is stored in the storage unit 127, for example. Note that the travel direction data of the aircraft 301 may be acquired at appropriate times from flight information or the like obtained from other systems in the aircraft 301.

The weighting calculation unit 52 determines whether or not the specified sound collecting location is present in a seating area. If the specified sound collecting location is present in the seating areas 305a and 305b rather than the aisle area 306, the audio data from a microphone present forward from the specified sound collecting location, based on the travel direction data of the aircraft 301, is used preferentially. In other words, audio data from a sound collecting unit located forward from the sound collecting location is given a heavier weight than audio data from a sound collecting unit located rearward from the sound collecting location. Specifically, the weighting calculation unit 52 calculates the weighting coefficients Wa and Wb by multiplying functions F(La) and F(Lb), determined in advance on the basis of the distances (La and Lb) between the microphones 312a and 312b and the specified sound collecting location, by a coefficient A. The coefficient A has a higher value when the specified sound collecting location is present in a seating area and the microphone is located forward from the specified sound collecting location. The coefficient A has a lower value when the specified sound collecting location is present in a seating area and the microphone is located rearward from the specified sound collecting location.

$$Wa = A \times F(La)$$

$$Wb = A \times F(Lb)$$

when sound collecting location is in seating area and sound collecting location is forward from microphone: A=B when sound collecting location is in seating area and sound collecting location is rearward from microphone: A=C when sound collecting location is in aisle area: A=D Here, B>D>C.

Using the weighting coefficients Wa and Wb, the audio synthesis unit 38 carries out processing such as that described below on the audio data ADa and ADb from the latency time correction units 37a and 37b, respectively, and outputs the synthesized audio data to the audio output unit 125.

$$Wa \times ADa + Wb \times ADb$$

3-4. Effects, Etc.

With the sound collecting device according to this embodiment as described thus far, when synthesizing audio from a sound collecting location selected by an operator on the basis of audio data from a plurality of microphones, if the sound collecting location is present in a seating area in which audio is outputted primarily in a forward direction, preferentially using the audio data from a microphone located forward from the sound collecting location makes it possible to synthesize the audio more accurately.

Other Embodiments

The aforementioned first, second, and third embodiments have been described as examples of the technique disclosed in this application. However, the technique according to this disclosure is not limited thereto, and can also be applied in embodiments in which the aforementioned details have been changed, replaced, added, or removed as appropriate. The constituent elements and functions described in the aforementioned first, second, and third embodiments can also be combined in order to obtain new embodiments.

[1]
Although an aircraft is described as an example of a moving object in the foregoing embodiments, the moving object may be another vehicle such as a train, a ship, or the like. An air conditioning unit of the moving object can be given as another example of a noise source. In other words, the noise source may be any noise source whose location in the moving object can be specified. If the location of the noise source moves, for example, movement information of the noise source may be stored in a memory and the location of the noise source may be specified on the basis thereof.

[2]
Although the foregoing embodiments described an example in which there are two instances of audio from microphones to be synthesized, this invention is useful even if there are three or more instances of audio from microphones to be synthesized. The locations and numbers of cameras and microphones, the visible ranges of the cameras and the audible ranges of the microphones, and so on are not limited to those described in the foregoing embodiments.

Figure 8:
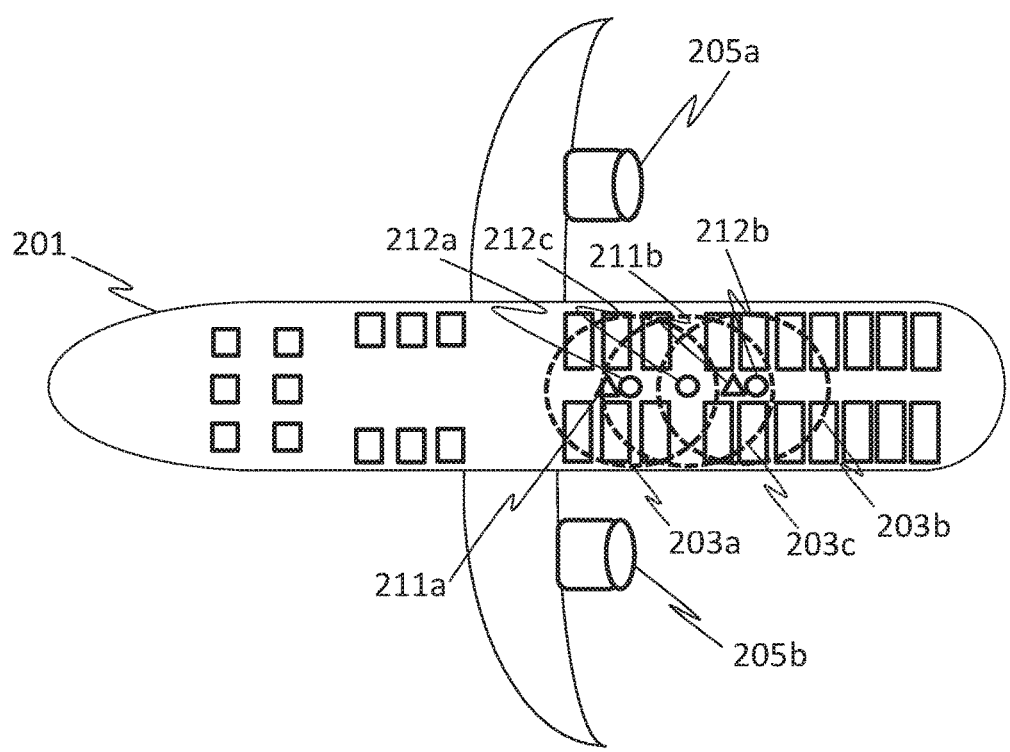
FIG. 8 illustrates an example of the arrangement of cameras and microphones in an aircraft according to another embodiment.

[3]
Although the foregoing embodiments describe two microphones 212a and 212b being arranged, a microphone 212c having a predetermined third range 203c as its audible range may be further provided, as illustrated in FIG. 8. The microphone 212c is arranged between the microphone 212a and the microphone 212b such that the third range 203c overlaps with the first range 203a and the second range 203b. In other words, the audible ranges of the microphones 212a, 212b, and 212c overlap with each other at least partially. At a sound collecting location closer to a noise source, the SNR(Signal to Noise Ratio) drops due to the effects of audio from the noise source, leading to a worsening of the accuracy of the audio synthesis. However, this arrangement makes it possible to achieve more accurate audio synthesis in the first range 203a and the second range 203b, which are closer to the noise sources 205a and 205b.

For example, if the specified sound collecting location is in an area shared by the first range 203a and the third range 203c, the audio playback is carried out by synthesizing the audio data from the microphones 212a and 212b in the second embodiment. However, in this embodiment, more accurate audio synthesis can be carried out carrying out audio playback by synthesizing the audio data from the microphones 212a and 212c.

[4]
Although the foregoing embodiment describes synchronizing the times managed by the time management unit 117a of the sound collecting unit 11a and the time management unit 117b of the sound collecting unit 11b with the time managed by the time management unit 126 of the sound collecting device 12, it is not absolute necessary to synchronize the times. For example, in the second and third embodiments, it is not absolutely necessary to provide the time management units 117a, 117b, and 126 and/or the functions of the network latency calculation unit 34, the latency time calculation unit 35, and the latency time correction units 37a and 37b. Even in this case, when synthesizing audio from a sound collecting location selected by an operator on the basis of audio data from a plurality of microphones, the audio data from a microphone closer to the sound collecting location and farther from a noise source, or the audio data of a microphone present forward from the sound collecting location in the seating area, can be used preferentially. As such, audio from the specified sound collecting location can be more accurately reproduced.

What is claimed is:

1. A sound collecting device that obtains and synthesizes audio data from a plurality of sound collecting units that collect sound, the device comprising:
   a processor that manages time for the plurality of sound collecting units and receives an instruction specifying a sound collecting location;
   an output unit that outputs the synthesized audio data; and
   a memory that stores first location information indicative of locations of the plural sound collecting units;
   wherein the processor obtains sound collection data including the audio data and time data from the plurality of sound collecting units;
   wherein upon receiving the instruction specifying the sound collecting location,
   the processor:
      receives second location information indicative of the specified sound collecting location,
      calculates a distance between the specified sound collecting location and at least one of the plurality of sound collecting units based on the first location information and the second location information,
      calculates a value, for synthesizing the audio data from the plurality of sound collecting units, based on the calculated distance, and
      synthesizes the audio data from the plurality of sound collecting units based on the time data using the calculated value.

2. The sound collecting device according to claim 1, wherein the processor calculates, as the calculated value, an audio latency of the plurality of sound collecting units based on the calculated distance.

3. The sound collecting device according to claim 1, wherein the processor calculates, as the calculated value, weighting coefficients based on distances between the specified sound collecting location and the plurality of sound collecting units calculated based on the first location information and the second location information.

4. The sound collecting device according to claim 1, wherein:
   the memory further stores third location information indicative of location of a noise source,
   wherein upon receiving the instruction specifying the sound collecting location, the processor obtains the third location information from the memory, and calculates, as the calculated value, weighting coefficients based on distances between the noise source and the plurality of sound collecting units calculated based on the first location information and the third location information.

5. The sound collecting device according to claim 1, wherein the device is installed in a moving object having an internal space containing an aisle area and a seating area, the seating area having seats in which a sound collection target is seated facing in a travel direction of the moving object; and
   upon receiving the instruction specifying the sound collecting location, the processor obtains travel direction data indicating the travel direction of the moving object, and based on the travel direction data, in the case where the specified sound collecting location is in the seating area, the processor gives a weight to the audio data of a sound collecting unit located forward from the sound collecting location, the weight being larger than a weight given to the audio data of a sound collecting unit located rearward from the sound collecting location.

6. A sound collecting system comprising:
the sound collecting device according to claim 1; and
a plurality of sound collecting units connected to the sound collecting device.

7. The sound collecting system according to claim 6, wherein the processor calculates, as the calculated value, an audio latency of the plurality of sound collecting units based on the calculated distance.

8. The sound collecting system according to claim 6, wherein the processor calculates, as the calculated value, weighting coefficients based on distances between the sound collecting location and the plurality of sound collecting units calculated based on the first location information and the second location information.

9. The sound collecting system according to claim 6, wherein:
the memory further stores third location information indicative of location of a noise source,
wherein upon receiving the instruction specifying the sound collecting location, the processor obtains the third location information from the memory, and calculates, as the calculated value, weighting coefficients based on distances between the noise source and the plurality of sound collecting units calculated based on the first location information and the third location information.

10. The sound collecting system according to claim 6, wherein three or more of the plurality of sound collecting units are arranged in locations near a noise source, and more of the sound collecting units are arranged in locations closer to the location of the noise source.

11. The sound collecting system according to claim 9, wherein the noise source is an engine of an aircraft.

12. The sound collecting system according to claim 6, wherein the sound collecting device is connected to the plurality of sound collecting units over a network; and
the processor calculates a latency time of the network on the basis of the time data of the plurality of sound collecting units and carries out time adjustment on the audio data of the plurality of sound collecting units, and synthesizes and outputs, from the output unit, the audio data of the plurality of sound collecting units.

13. A sound collecting method using a sound collecting device that obtains and synthesizes audio data from a plurality of sound collecting units that collect sound, the method comprising:

the plurality of sound collecting units sending sound collection data including the audio data and time data to the sound collecting device;
upon an instruction specifying a sound collecting location being received,
receiving a first location information indicative of location of the plurality of sound collecting units and a second location information indicative of the specified sound collecting location,
calculating distance between the specified sound collecting location and at least one of the plurality of sound collecting units based on the first location information and the second location information,
calculating a value based on the calculated distance, and
synthesizing the audio data of the plurality of sound collecting units based on the time data of the plurality of sound collecting units and the calculated value, using a processor of the sound collecting device; and
outputting the audio data of the sound collecting location using the processor.

14. The sound collecting method according to claim 13, further comprising:
storing first location information indicative of location of the plurality of sound collecting units in a memory,
wherein the processor calculates, as the calculated value, an audio latency of the plurality of sound collecting units based on the calculated distance.

15. The sound collecting method according to claim 13, further comprising:
storing first location information indicative of location of the plurality of sound collecting units in memory,
wherein the processor calculates, as the calculated value, weighting coefficients based on distances between the specified sound collecting location and the plurality of sound collecting units calculated based on the first location information and the second location information.

16. The sound collecting method according to claim 13, further comprising:
storing first location information indicative of location of the plurality of sound collecting units and third location information indicative of location of a noise source in a memory,
wherein the processor calculates, as the calculated value, weighting coefficients based on distances between the noise source and the plurality of sound collecting units calculated based on the first location information and the third location information.

* * * * *